(12) United States Patent
Schmid

(10) Patent No.: US 7,693,966 B2
(45) Date of Patent: Apr. 6, 2010

(54) AUTOMATIC CONFIGURATION OF A NETWORK

(75) Inventor: Bernhard Schmid, Ebersbach (DE)

(73) Assignee: Hirschman Electronics GmbH & Co. KG, Neckartenzlingen (DE)

( * ) Notice: Subject to any disclaimer, the term of this patent is extended or adjusted under 35 U.S.C. 154(b) by 1155 days.

(21) Appl. No.: 10/433,297

(22) PCT Filed: Dec. 13, 2001

(86) PCT No.: PCT/EP01/14669

§ 371 (c)(1),
(2), (4) Date: Jun. 4, 2003

(87) PCT Pub. No.: WO02/49273

PCT Pub. Date: Jun. 20, 2002

(65) Prior Publication Data

US 2004/0103176 A1 May 27, 2004

(30) Foreign Application Priority Data

Dec. 14, 2000 (DE) .............................. 100 62 322
Dec. 10, 2001 (DE) .............................. 101 60 385

(51) Int. Cl.
*G06F 15/177* (2006.01)
(52) U.S. Cl. .................... 709/220; 709/223; 709/224
(58) Field of Classification Search ............... 709/220, 709/221, 222, 224, 229
See application file for complete search history.

(56) References Cited

U.S. PATENT DOCUMENTS

| 5,442,639 | A | * | 8/1995 | Crowder et al. ............. 714/712 |
| 5,526,489 | A | | 6/1996 | Nilakantan et al. |
| 5,758,071 | A | * | 5/1998 | Burgess et al. .............. 709/220 |
| 5,980,078 | A | * | 11/1999 | Krivoshein et al. ............ 700/1 |
| 6,098,116 | A | * | 8/2000 | Nixon et al. ................... 710/8 |
| 6,128,729 | A | * | 10/2000 | Kimball et al. ............... 713/1 |
| 6,209,033 | B1 | * | 3/2001 | Datta et al. ................. 709/224 |
| 6,212,559 | B1 | * | 4/2001 | Bixler et al. ................ 709/221 |
| 6,430,151 | B1 | * | 8/2002 | Glas et al. .................. 370/222 |

(Continued)

FOREIGN PATENT DOCUMENTS

WO    WO 01/50711 A1    7/2001

(Continued)

OTHER PUBLICATIONS

Raue A: "*Netzmanagment Fuer Die Fabrik Der Zukunft. \Network Management For The Factory Of The Future*", ZWF Zeitschrift Fur Wirtschaftliche Fertigung Und Automatisierung, Carl Hanser Verlag. Munchen, DE, Bd. 88, Nr. 4, Apr. 1, 1993, Seiten 163-165, XP000360363, ISSN: 0947-0085.

(Continued)

*Primary Examiner*—Salad Abdullahi
*Assistant Examiner*—El Hadji M Sall
(74) *Attorney, Agent, or Firm*—Fulbright & Jaworski L.L.P.

(57) ABSTRACT

The invention relates to a method and a device for monitoring and controlling the configuration of terminals and/or network components within an electronic network. A configuration unit is provided in the network, the configuration unit monitors the configuration and can automatically configure the terminals connected to the network, and/or the network components.

8 Claims, 1 Drawing Sheet

U.S. PATENT DOCUMENTS 6,754,207 B1 * 6/2004 Hesse .................. 370/388

FOREIGN PATENT DOCUMENTS

WO    WO 01/82032 A2    11/2001

OTHER PUBLICATIONS

Mueller R: "*LON-DAS Universelle Netzwerk Teil 1. \Ein Neuartiges Konzept, UM Steuergeraete, Sensoren Und Aktoren Miteinander Sprechen Zu Lassen*" Elektronik, Franzis Verlag GMBH. Munchen, DE, Bd. 40, Nr. 22, Oct. 29, 1991, Seiten 59-62, 64-65, XP000268228, ISSN: 0013-5658.

\* cited by examiner

AUTOMATIC CONFIGURATION OF A NETWORK

BACKGROUND OF THE INVENTION

1. Field of the Invention

The present invention relates to a process and a device for configuration of electronic networks, especially networks including multiple, replaceable network terminals, and more particularly to a process and a device to exchange data between terminals.

2. Description of the Related Technology

It is generally known that a network of terminals (networkable devices such as PCs, input or output means or the like) exchange data via network components (for example, a fieldbus). When connected to these networks and for start-up, the communications and operating parameters must be configured at the terminals and also at the network components themselves before data exchange via the network and regular operation is possible. The type of parameter configuration is dependent on the type of network and can be simple or complex, can be carried out manually or partially automatically and accordingly imposes different requirements on the qualifications of the operator.

One important requirement for operation of control and automation hardware is rapid replacement of failed devices or network components in order to minimize costly down times of systems to be controlled. The replaced devices or components must be configured before their start up in the same manner as the failed devices in order to be able to perform their functions after replacement. Thus configuration of communications parameters for fieldbus capable devices is limited simply to setting a few switches; this can be done even by minimally qualified personnel.

Recently network standards which have actually been developed for office communications (such as for example Ethernet, local bridges as per IEE802.1 and the TCP/IP protocol family) are being used increasingly for other control and automation tasks. The configuration of communications and operating parameters of devices and network components is more complex and extensive than in fieldbusses for this network environment. This is perhaps acceptable within office communications since qualified personnel are available and downtimes are less critical. But extensive configuration set ups in the area of control and automation technology cannot be accepted since here on the one hand downtimes are more costly and generally qualified personnel are not available.

SUMMARY OF THE INVENTION

Therefore an object of the present invention is to devise a process and a device for configuration of network terminals and network components for complex network environments, with which the initially described disadvantages are avoided.

It is provided by the present invention that a configuration of at least one network terminal and/or at least one network component is determined using a configuration unit which is connected at an arbitrary position within the network. In this way it becomes possible to centrally configure the network components and terminals via the configuration unit before start-up of the network. But for the case in which a terminal and/or network component was defective and had been replaced, the replaced terminal or the replaced network component can be centrally configured via the configuration unit. Thus it becomes possible after start-up of the network, when there are no longer appropriately trained personnel available, or when they are available, but not in insufficiently short time, to transfer the configuration data in the start-up of the network system in this fault case especially automatically to the replacement components. The configuration unit is therefore set up by qualified personnel when the system is started up, i.e. supplied with all required information about the communications and operating parameters of the network components and the terminals and the network topology, i.e. about the cabling structure of the network, type, number and locations of the terminals, type, number and locations of the network components. The configuration unit can afterwards automatically configure the replacement devices or replacement components without manual intervention. The failed terminal or the failed network component and the replacement terminal (component) can be automatically reassigned for one another by this automation without manual intervention and the replacement device (component) can be independently configured, i.e, automatically with the communications and operating parameters of the failed terminal or network component and can thus assume its function.

With corresponding software and a graphic display the configuration unit can carry out the steps which become necessary for configuration and then steps can be displayed graphically and edited so that on the one hand reconfiguration is undertaken as fast as possible and on the other this work can be carried out by less qualified personnel. The major advantages consist in that the topology of the network need not be rigidly stipulated, but that with simple steps configuration of networks with different topologies, even in local networks with variable topology such as an Ethernet, can be enabled and can also be undertaken by personnel not specially trained for these tasks.

It is provided in a development for the invention that the configuration unit compares the actual topology of the network to a theoretical topology. In doing so this comparison can be carried out continuously or discontinuously, these comparison variations can also be manually influenced from the outside. During such operation, therefore the configuration unit can continuously monitor the current topology of the network and by comparison with the theoretical topology recognize failures of network components and/or terminals and likewise the replacement and connection of replacement devices to the network. Depending on the application site of the replacement terminal or the replacement component, the configuration unit configures the parameters of the replacement terminal or replacement component, such as for example the IP address, network mask, gateway address and the like. Here, for example, standardized processes such as BOOTP or DHCP protocols can be used.

In another development for the invention a theoretical topology can be stipulated by manual input and/or automatically when the network is started up. By stipulating the theoretical topology which is stored in the configuration unit, when a system is set up or changed all data on network topology are transferred, i.e. the cabling structure of the network, the type, the number and locations of the network components, and the type, number and locations of connected terminals. In order to be flexible in setting up the system, depending on assumptions, data can be transferred manually from the configuration unit to the terminals or the network components. Alternatively, the configuration unit can also automatically recognize the network topology when the system is set up or modified and can store it as a setpoint.

In a further development of the invention the configuration unit detects and checks the replacement of one terminal and/or one network component. In this way the configuration unit can detect by acquisition of a current actual topology and then comparison with another acquired actual topology which follows it in time that replacement of a terminal and/or a network component has taken place. After replacement of a terminal or a network component the communications parameters (such as IP address, gateway address, network mask) are configured, whereupon the configuration unit can communicate with the terminal or the network component and the replacement terminal or replacement component and check as to whether it can functionally replace the failed component or device. If replacement is possible, the operating parameters of the replacement terminal or the replacement component are configured accordingly; this configuration can follow for example by sending and loading a configuration file within the replaced component. But if the replaced device or the replaced component cannot functionally replace the failed device or the failed component, an error message is generated (for example from the configuration unit) in order to signal that the newly installed device or the corresponding component is not suitable for operation.

BRIEF DESCRIPTION OF THE DRAWING

An example of a process and a sample network according to an embodiment for the invention are described below and explained using a FIGURE. The invention is not limited to the shown network or applications of that network, but can be used in general in other networks.

DETAILED DESCRIPTION

Figure 1:
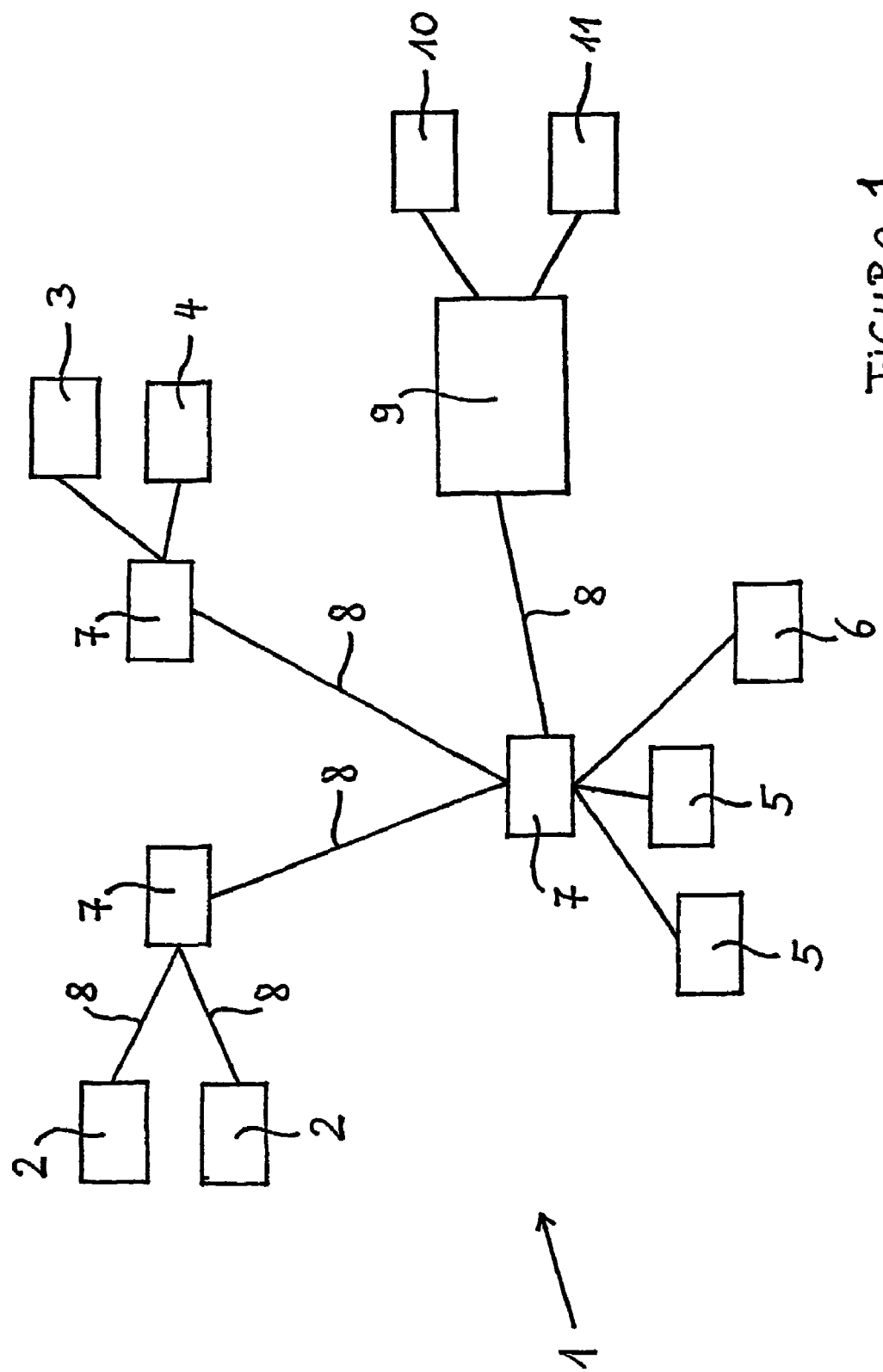
FIG. 1 shows a block diagram for a network including a configuration unit according to the present invention.

FIG. 1 shows a network 1 which has one or more terminals 2 (for example, a PC) in any number and at any location. The term terminal also includes input units 3, output units 4, sensors 5 and actuators 6 and other comparable devices. The number and location of these terminals depends on the topology of the network. For example, possible applications include control of process-engineering systems or other applications in control and automation engineering and within office communications. But these do not constitute any limitation on applications for this invention.

The described terminals with reference numbers 2 to 6 are connected either individually or in groups to network components 7. Depending on the type and location of the terminal, data are exchanged between the respective terminal and the pertinent network component 7 via a data line 8, and within the network 1 identical or different data lines 8 can be used. Reference number 9 labels a configuration unit 9 which is connected within the network 1 and via which configuration data for at least one terminal 2 to 6 and/or at least one network component 7 is undertaken. In order to be able to stipulate a theoretical topology for the network 1, the configuration unit 9 has storage means (not shown) in which a theoretical topology for the network 1 is filed. If the theoretical topology is to be stipulated from the outside, this can take place via an input unit 10 which is connected to the configuration unit 9 or as a component of the configuration unit 9. It is likewise conceivable for the configuration unit 9 to have a capability for detection of the topology of the network 1, with which the terminals 2 to 6 and the network components 7 can be detected and located. Both the theoretical topology and also the current topology can be displayed on an output unit 11 of the configuration unit 9. For this purpose the configuration unit 9 detects and monitors the current topology of the network 1, especially continuously. If in this detection or monitoring it is ascertained that a terminal and/or network component 7 is operating in a faulty manner, i.e., has failed, or has been removed from the network 1, a corresponding error message can be produced on the output unit 11 of the configuration 9. In this way it is possible to react immediately to the type of error which is represented by the error message so that downtime in the system is for the most part avoided. Thus, this especially continuous monitoring of the topology of the network can be used for network diagnosis (especially error detection and location).

What is claimed is:

1. A method for setting electronic network configuration data, said configuration data including communications and operating parameters, said network including at least one network component, said method including:
   connecting a configuration unit to said network;
   determining an initial topology of said network;
   determining configuration data set into said network component to control at least communications and operating parameters for said network;
   storing said configuration data;
   determining, by the configuration unit, a current topology of said network;
   comparing, by the configuration unit, said initial topology and said current topology to locate a replaced network component; and
   automating said configuration unit to be able to transmit stored configuration data from said configuration unit to said replaced network component to configure said replaced network component into said network;
   using said configuration unit to determine separate configuration data for each of at least two network terminals and for each of at least two network components, each of said network components separately being connected to each of said at least two network terminals; and
   storing said determined configuration data for each of said at least two network terminals and network components to provide current topology;
   displaying said determined configuration data on said graphic display;
   inputting data to said configuration unit to provide changed configuration data; and,
   transmitting said changed configuration data from said configuration unit to said network terminal to reconfigure said network terminal in said network.

2. The method according to claim 1, wherein a network terminal is connected to said network component and said network terminal is a personal computer.

3. The method according to claim 1, wherein said network component is a field bus.

4. The method according to claim 1, further including:
   providing said initial topology to said configuration unit by manual input.

5. The method according to claim 2, wherein said configuration unit includes an input means for inputting data by an operator, and said configuration unit further includes a graphic display for showing data graphically to said operator.

6. An electronic network having at least two network components, and said network comprising:
   a configuration unit connected to said network;
   said configuration unit including control software to control transmission and receipt of signals from a selected network component to determine configuration data set for said selected network component to control at least communications and operating parameters for said network;
   first storage means for storing said determined configuration data;

said configuration unit further including control software to transmit said determined configuration data from said configuration unit to a replaced network component to configure said replaced network component into said network wherein there is at least one network terminal connected to at least one network component said configuration unit including control software to control transmission and receipt of signals from each of said network terminals and from each of said network components; and said configuration unit including a second storage means for storing said determined configuration data for each of said network terminals and said network components to provide a stored monitored network topology;

said configuration unit including third storage means for storing a theoretical network topology;

said configuration unit comprising comparison means for comparing said monitored network topology to said theoretical network topology and further comprising input means for receiving configuration data, and further comprising graphic display means for showing configuration data graphically; and wherein:

changed configuration data is input to said configuration unit by said input means; and wherein said configuration unit comprises means for transmitting said changed configuration data to said replacement network component.

7. The electronic network according to claim 6, wherein said at least one network terminal comprises a personal computer.

8. The electronic network according to claim 6, wherein at least one of said network components comprises a fieldbus.

* * * * *